(12) United States Patent
Viaud (10) Patent No.: US 7,197,858 B2
(45) Date of Patent: Apr. 3, 2007

(54) APPARATUS FOR SECURING A LOOSE TWINE END TO A ROUND BALE

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 19 days.

(21) Appl. No.: 11/177,721

(22) Filed: Jul. 8, 2005

(65) Prior Publication Data

US 2006/0005510 A1 Jan. 12, 2006

(30) Foreign Application Priority Data

Jul. 10, 2004 (DE) .................. 10 2004 033 436

(51) Int. Cl.
*B65B 11/56* (2006.01)
(52) U.S. Cl. ............... 53/137.2; 53/118; 53/587; 100/15; 100/76; 100/88
(58) Field of Classification Search ............. 53/137.2, 53/118, 176, 211, 587; 100/5, 15, 76, 88; 56/341, 344
See application file for complete search history.

(56) References Cited

U.S. PATENT DOCUMENTS

| | | | |
|---|---|---|---|
| 4,409,784 A * | 10/1983 | VanGinhoven et al. ....... 56/341 |
| 4,457,226 A * | 7/1984 | Meiers ........................... 100/5 |
| 4,599,844 A * | 7/1986 | Clostermeyer et al. ........ 53/118 |
| 4,796,524 A * | 1/1989 | Renaud .......................... 100/3 |
| 5,243,806 A * | 9/1993 | Jennings et al. .............. 53/118 |
| 5,419,253 A * | 5/1995 | Campbell ....................... 100/3 |
| 5,894,790 A | 4/1999 | Viaud |
| 6,453,805 B1 * | 9/2002 | Viaud et al. .................. 100/31 |
| 2003/0230046 A1 * | 12/2003 | Viaud et al. .................. 53/118 |

FOREIGN PATENT DOCUMENTS

| | | |
|---|---|---|
| DE | 41 32 664 | 10/1991 |
| DE | 199 30 674 | 7/1999 |
| EP | 0 535 532 | 9/1992 |
| EP | 1 064 839 | 6/2000 |
| EP | 1 346 627 | 3/2003 |

* cited by examiner

*Primary Examiner*—Thanh Truong (57) ABSTRACT

The invention relates to an apparatus for securing a loose twine end on a round bale by means of a band, with an adjusting drive, that can be operated to cause the band to engage with a conveyor element by which it can be wound about a round bale in the area of the loose twine end. A band supply, along with the band, can be moved by the adjusting drive between a first position, wherein the band supply lies against the conveyor element and the band is carried by the conveyor element, and a second position, wherein the band supply is at a distance from the conveyor element.

13 Claims, 8 Drawing Sheets

APPARATUS FOR SECURING A LOOSE TWINE END TO A ROUND BALE

BACKGROUND

1. Field of the Invention

The invention generally relates to an apparatus for securing a loose twine end on a round bale.

2. Background of the Invention

A typical round bale press includes a twine binding apparatus and an apparatus for securing a twine end lying on the circumferential surface of the round bale. In prior art bale presses, securing of the twine end occurs by means of a band that can be adhesive or otherwise self-adhering and that is guided to an inlet gap for the crop matter by means of two feed rollers, one being driven, and one being a guide. There, the band is detected by the rotating bale and wound thereabout. The band is separated from the supply roller by turning off the drive for the feed rollers, which causes the band to tear off. One disadvantage of this system is that the feed rollers require a discrete drive.

In another apparatus for securing a loose twine end, a loose end of the band is pressed by means of a guide device, moved by a motor, against a driven conveyor element, such as a belt, and carried thereby and brought to the circumference of the bale. The band is separated from its supply roller by a separate separating device that constitutes a strip and pointed pins arranged thereon. The guide device, which can be moved by a motor actuation apparatus, brings the band against the separating device as soon as the bale has been wrapped sufficiently, so that the band segment wrapped about the bale is separated from the remaining supply. In this apparatus, the band must first be threaded by an operator about a plurality of rollers and then introduced between the guide device and the conveyor element, which is quite a time consuming process and is prone to error.

The problem upon which the invention is based is to provide an apparatus for securing a loose twine end to a round bale in a manner that is an improvement over the prior art.

SUMMARY OF THE INVENTION

In the present invention, the actual band supply is brought into a first position against the conveyor element using the adjusting drive so that the conveyor element detects the free end of the band and feeds it to the round bale in order to wrap the loose twine end with the band. Then, the band supply is withdrawn from the conveyor element and brought into a second position. In one embodiment, the conveyor element can be a belt or another pressing means for producing the round bale. In an alternate embodiment, however, the round bale can itself act as conveyor element. The apparatus is then arranged in a suitable opening of the bale pressing space, such as the inlet. In this manner no laborious threading of the beginning of a new band supply into the apparatus is necessary after a band supply has been used up.

Once the round bale has been wound with a sufficient amount of the band, a separating device is preferably activated that separates the band wound about the round bale from the remaining band supply. In order to do without a separate drive for moving the separating device between its active and inactive positions, the adjusting drive can also be used for this. Alternatively, it would also be possible to provide a separate drive for the separating device or to stop the band supply using a brake so that the band tears off.

The adjusting drive preferably disengages the circumference of the band supply from the conveyor element and thus synchronously moves the separating device into its active position. The movement of the separating device usefully occurs on a circular path, although a linear movement would also be possible.

The adjusting drive moves the band supply on a straight or arcuate path between the first and second positions. Thus, linear or rotational drives can be considered. This movement can be converted to a rotational movement of the separating device by means of a rotatable element that is supported on an axle carrying the band supply and a longitudinally extended element that does not complete the movement of the band supply and on which the rotatable element rolls off. In particular a gear rack can be used as the longitudinally extended element, while the rotatable element can then be a toothed wheel.

A good separating effect is attained if the separating device moves the band against an anvil. The separating device is preferably situated upstream of the contact point between band supply and conveyor element. Thus, in its active position it cooperates with the exterior side of the band.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE EMBODIMENTS

Figure 1:
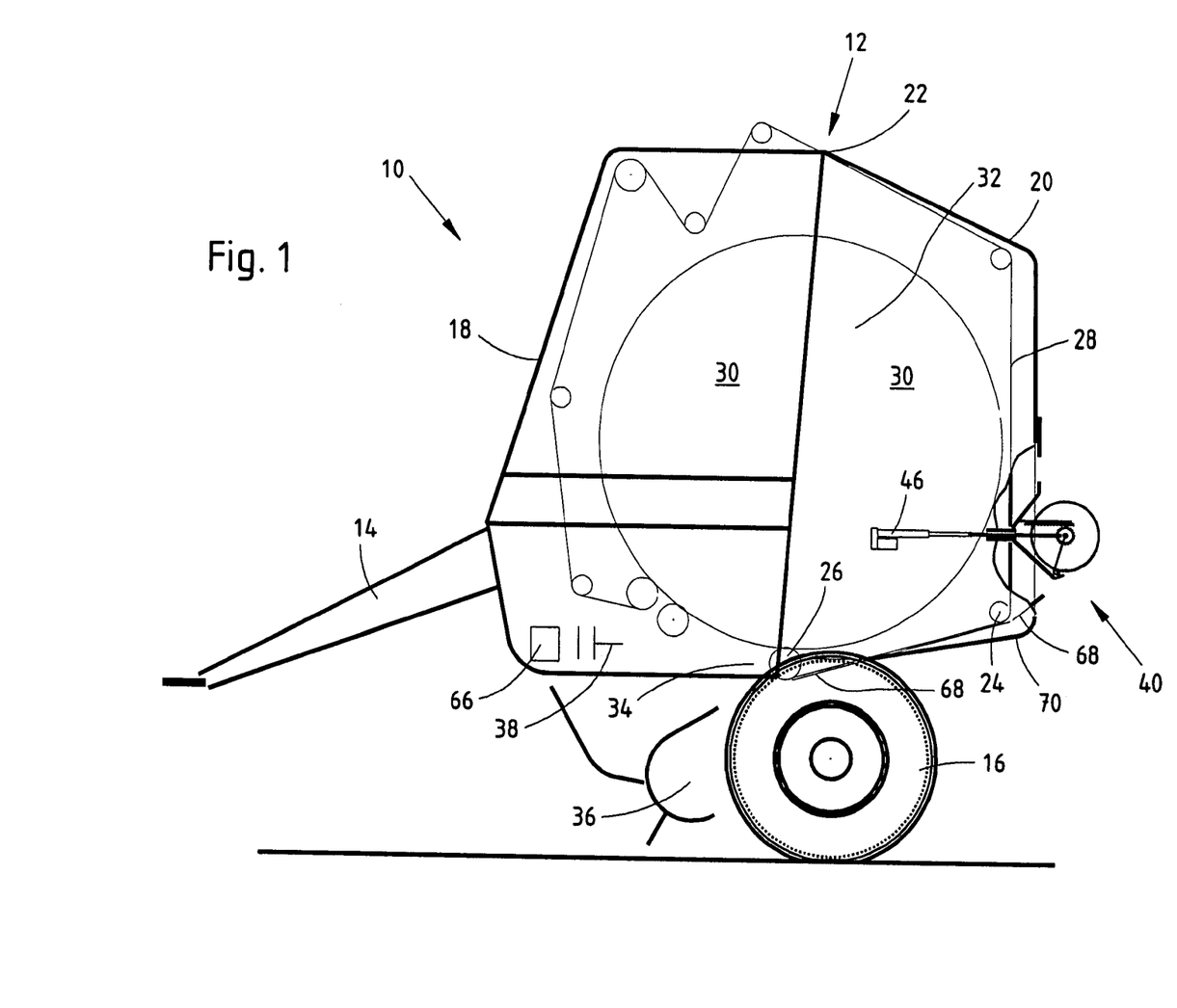
FIG. 1 is a schematic side elevation view of a round bale press having features of the present invention.

FIG. 1 illustrates a round bale press 10 with a housing 12, that can be attached to a farming tractor (not shown) by means of a draw-bar 14 in order to be pulled, to the left with respect to FIG. 1, in a direction of travel across a field, and that is supported on wheels 16. The housing 12 constitutes a front, rigid housing section 18 and a rear, pivotable housing section 20, which are pivotably joined to one another at an articulation 22 situated above. The housing 12 carriers a plurality of rollers, of which a rear lower roller 24 and a front lower roller 26 of the rear housing section 20 are shown. Traveling via the rollers 24, 26 are a plurality of continuous conveyor elements 28 that are arranged adjacent to one another and, along with the side walls 30 of the housing 12, surround most of a bale pressing space 32. The conveyor elements 28 in this embodiment are designed as belts. Provided in the lower area of the bale pressing space 32 is an inlet 34 that is limited to the rear by the roller 26 and that permits crop material that is picked up by a pick-up 36 to enter the bale pressing space 32.

Provided below the draw-bar 14 and in the area of the inlet 34 is a twine tying apparatus 38 with which the twine can be wound about the rotating round bale in order to bind it. As shown, the twine tying apparatus 38 is designed such that the last twine windings are placed on the left side of the round bale in the direction of forward travel. Such a round bale press 10 is well known in the art and does not require further description.

Figure 2:
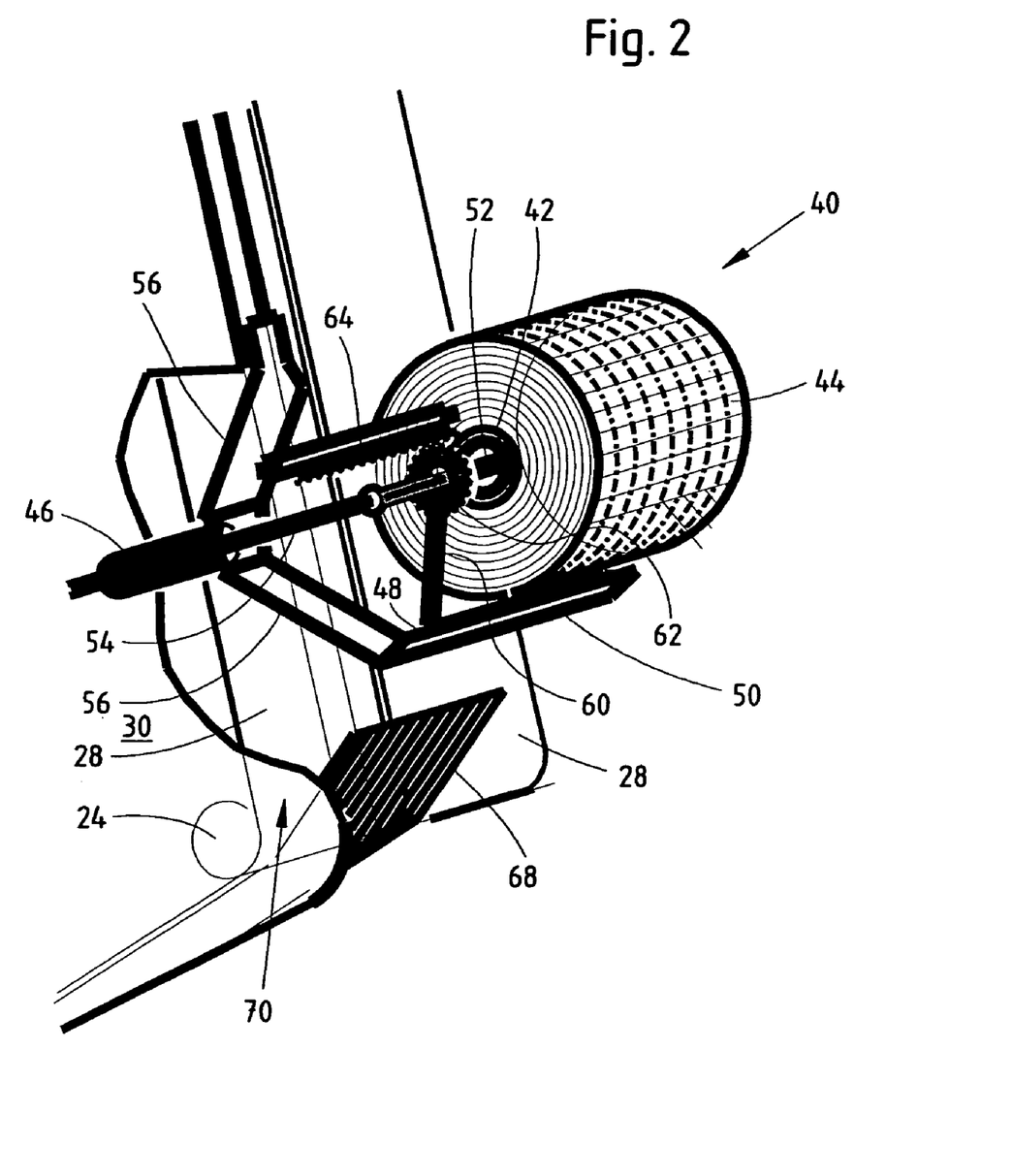
FIG. 2 is an enlarged perspective elevation of the rear area of the round bale press with an apparatus for securing a loose twine end on a round bale.

FIG. 2 illustrates the rear housing section 20 as seen from the left side in the direction of travel. In this depiction, in particular the right-hand rear side wall 30, two conveyor elements 28, and an apparatus 40 for securing the loose twine end to the surface of the round bale can be seen. The apparatus 40 includes a roller carrier 42, a roller-shaped band supply 44, an adjusting drive 46, a separating device 48, an anvil 50, and a guide device 68.

Here the apparatus 40 is illustrated in connection with a round bale press 10 with a bale press space 32 that is variable in size and that is surrounded by belt-like conveyor elements 28. Deviating from this, this apparatus 40 can also be provided on a round bale press 10 with a bale press space 32 that does not vary in size and at another location than on the rear wall 60 of the of the rear housing section 20. Likewise, chains or rollers can also be used instead of the belts.

The roller carrier 42 is rotatably supported on an axle 52 that extends transverse to the direction of travel and is joined to the movable output drive of the adjusting drive 46 via a holding arm 54 that runs in the direction of travel. The axle 52 is supported rotatably about its longitudinal axis on the holding arm 54. The adjusting drive 46 is attached to the exterior side of the side wall 30, while the holding arm 54 is supported movable longitudinally on a mounting 56 that is itself attached to the rear edge of the side wall 30. The mounting 56 also carries the anvil 50. The mounting 56 is located on the left-hand side of the roller carrier 42. In contrast to the illustrations, the mounting 56 could also support the right-hand end of the axle 52, relative to the direction of travel, and/or the anvil 50.

The roller carrier 42 is provided for receiving a roller of the roller-shaped band supply 44, whereby a brake (not shown) can be provided between the band supply 44 and the roller carrier 42. The brake prevents the band supply 44 from rotating freely on the roller carrier 42.

The band supply 44 contains a large quantity of thin, elastic, solid, and adhesive band 58. It is preferably net-like. The adhesive effect can be achieved by an adhesive applied to one or both sides of the band 58, by the net shape, and/or by adhesion. If a band supply 44 is used up, it can be replaced by a new one. Any roller carriers 42 can be used for the band supply 44. Reference is made in particular to known holders for colored bands or printing material present on rollers in printers, e.g. thermoprinters. The roller carrier 42 also includes means for fixing the band supply 44 in the lateral direction.

The separating device 48 includes a strip that extends across the width of the band 58 and that is pivotably supported on the axle 52 by an end-side pivot arm 60. The pivot axis of the separating device 48 thus runs coaxially with the axis of rotation of the roller carrier 42. A plurality of pins and/or notches, extending from the strip 66 in the direction of the band 58, are attached to the strip 66. Instead of the pins or notches, teeth could also be provided with which it is possible to perforate the band so that it tears when it is penetrated. When the separating device 48 is in the resting position, as shown in FIG. 2, it lies against the anvil 50. The pivot arm 60 is joined to a toothed wheel 62 that is arranged coaxially with the axle 52. The toothed wheel 62 engages with a gear rack 64 that extends approximately horizontally and in the direction of travel and is attached at its front side to the holder 56.

Figure 3:
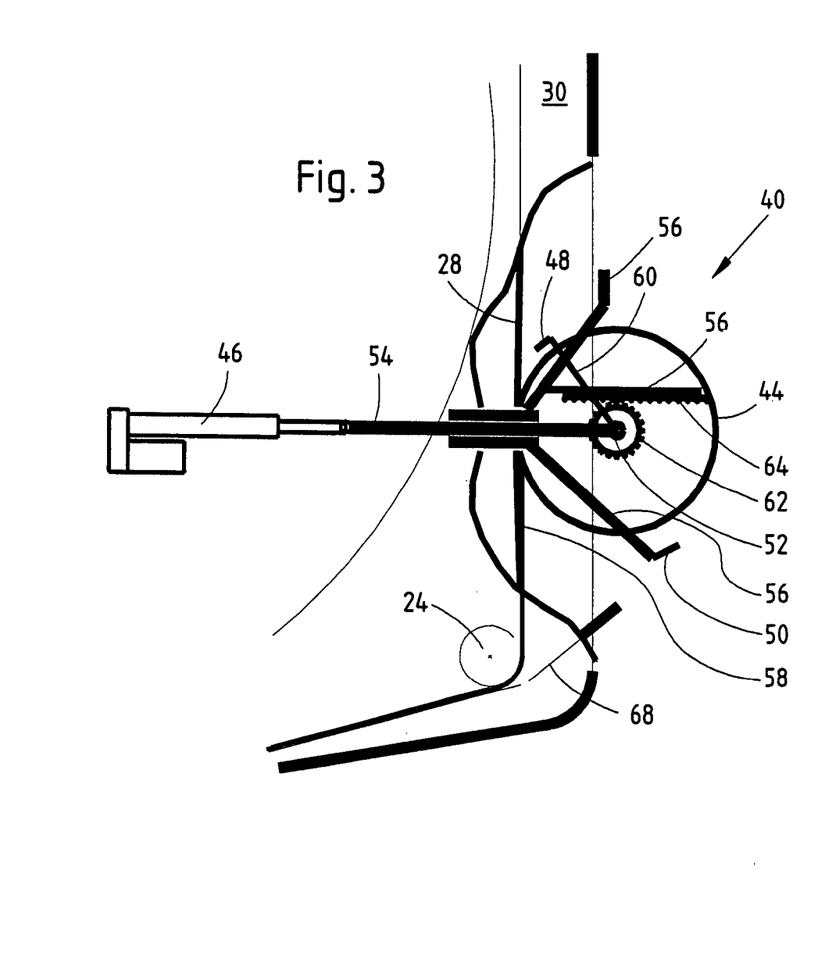
FIG. 3 is a side elevation of the rear area of the round bale press shown in FIG. 2.
Figure 4:
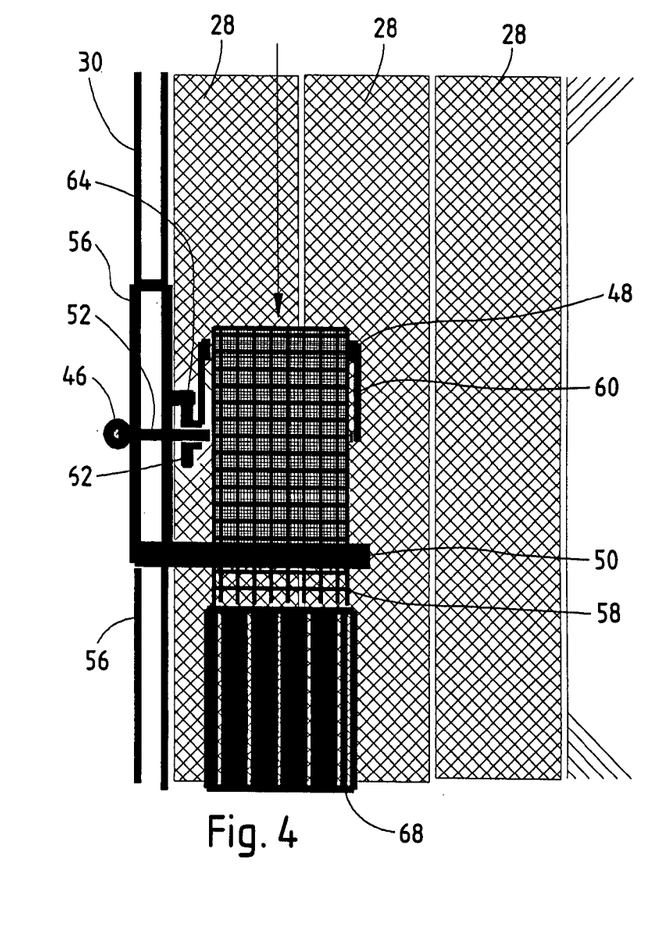
FIG. 4 is a rear elevation of the rear area of the round bale press shown in FIG. 2.

Using the described arrangement, the adjusting drive 46 can be used to displace the axle 52, with the roller carrier 42 and band supply 44 arranged thereupon. The axle 52 is moveable in the direction of travel of the round bale press 10 between a first position, in which the band supply 44 lies against the conveyor element 28 (FIGS. 3, 6, and 8) and a second position (FIGS. 1, 2, 5, and 7), in which the band supply 44 is at a distance from the conveyor element 28. When the axle 52 is displaced, the gear rack 64, running parallel thereto, and the toothed wheel 62 cause the separating device 50 to rotate about the axle 52. If the axle 52 is displaced forward by the adjusting drive 46, the separating device 48 rotates clockwise relative to FIG. 2 and is thus moved in the direction of the conveyor element 28. The adjusting drive 46 thus displaces the holding arm 54 in a linear manner. The adjusting drive 46 can be a pneumatic cylinder, hydraulic cylinder, or an electric linear drive, and is connected to a control 66.

The guide device 68 extends from a front end that is located below the conveyor element 28 and the roller 26, rearward and upward to a position below the roller 24 and from there diagonally upward and rearward. The surface of the guide device 68 that faces the band 58 has a relatively low coefficient of friction.

Figure 5:
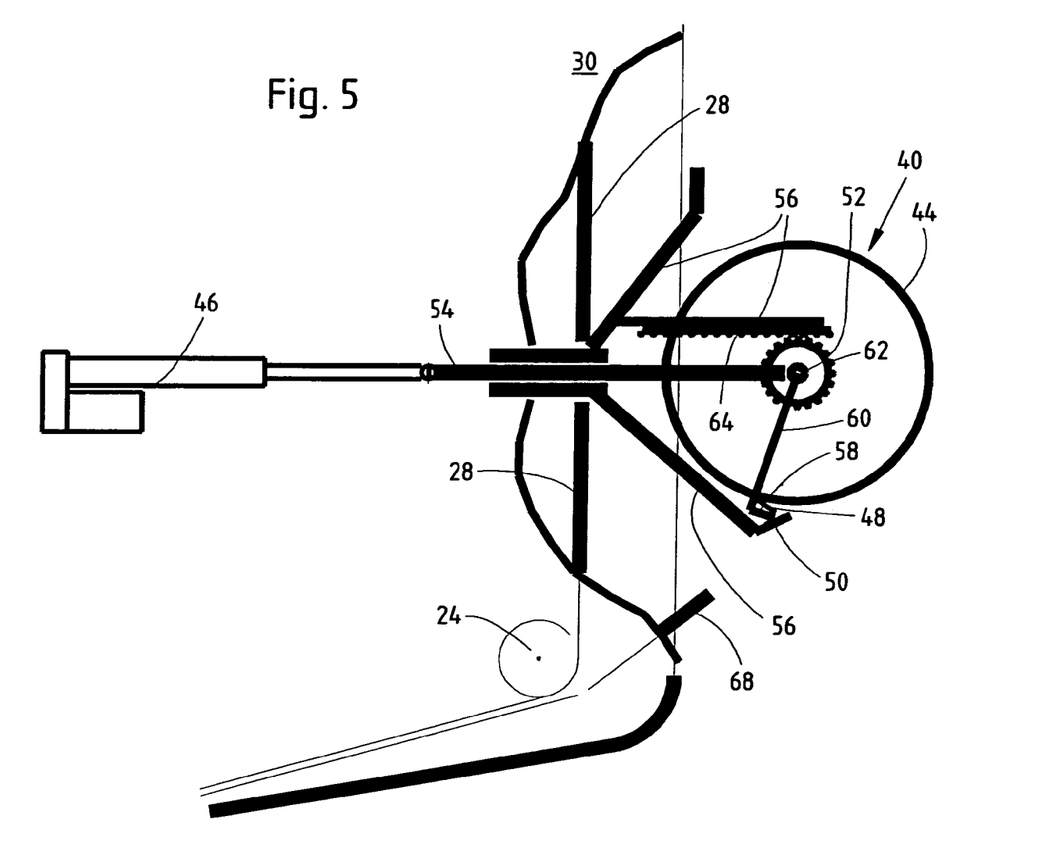
FIG. 5 is a side elevation of the apparatus shown in FIG. 2 in a resting position.

In accordance with all of this, the following function results, whereby it is assumed that the free end of the band 58 is located between the anvil 50 and the separating device 48 while the separating device 48 is in the position illustrated in FIG. 2. The situation is as illustrated in FIG. 5.

After a concluded tying process by the twine tying apparatus 38, there are one or more loose twine ends on the left-hand end area of the round bale, specifically overlapping the band 58. The control 66 receives a signal indicating this fact and causes the adjusting drive 46, the holding arm 54, and the axle 52 to move forward in the direction of travel. At the same time, the separating device 48 rotates clockwise (with respect to FIGS. 1–3). This causes the circumference of the band supply 44 to lie against the adjacent conveyor element 28, which leads to unwinding the band 58 from the band supply 44.

The free end of the band 58 is thus successively conveyed into an intermediate space 70 between the conveyor element 28 and the guide device 68 and then travels into the gap between the area of the conveyor element 28, which extends between the rollers 24, 26, and the guide device 68. Due to high friction between the band 58 and the conveyor element 28, and low friction between the band 58 and the guide device 68, the band 58 is carried along and conveyed to the inlet 34, where it runs about the roller 26 and into the gap between the round bale and the conveyor element 28. The round bale carries the band 58 further and winds it about its circumferential surface in the area of the loose twine ends.

After more than one rotation of the round bale, the second layer of the band 58 lies on the first layer and adheres due to the adhesion and/or net-shape of the band and/or the adhesive, so that the loose twine ends are secured.

Figure 6:
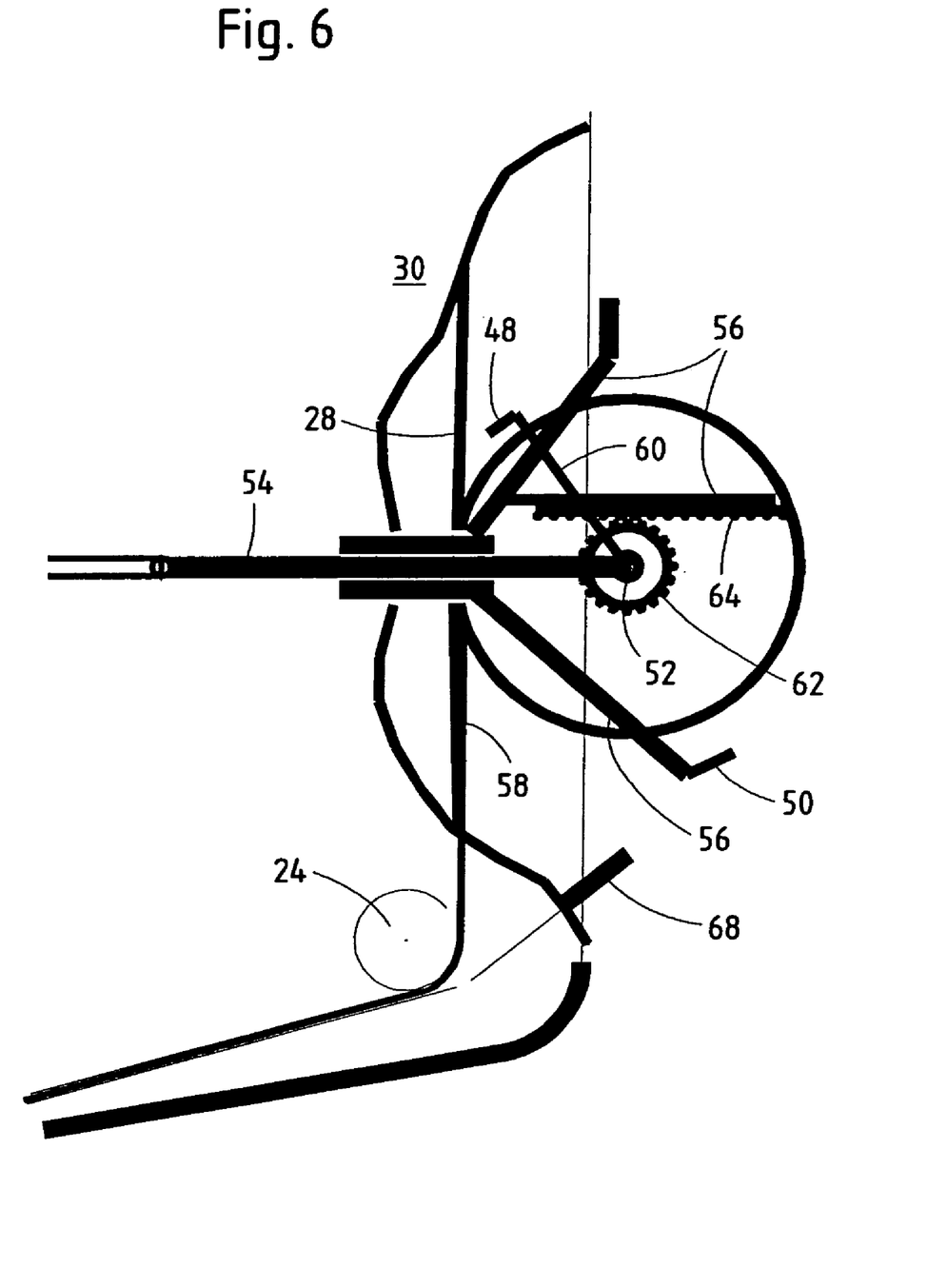
FIG. 6 is a side elevation of the apparatus shown in FIG. 2 in a position wherein the band is detected by the conveyor element.

As soon as secure adhesion of the band layers has been provided, which can be detected in an expired period of time by a rotary sensor on the band supply 44 or in any other desired manner, the control 66 causes the adjusting drive 46 to displace the holding arm 52 in the second direction, i.e. to the rear. Again, the displacement of the axle 52 initially disengages the circumference of the band supply 42 from the surface of the conveyor element 28. In addition, the gear rack 64 and the toothed wheel 62 rotate the separating device counterclockwise (with reference to FIGS. 1 through 3), which leads to a situation in which the separating device 48 is rotated into its active position against the anvil 54. This causes the band 58 to be caught between the separating device 48 and the anvil 54 so that the pins, teeth, notches, or the like of the separating device 48 penetrate into the band 58, as shown in FIG. 6. As soon as the band 58 is penetrated by the projecting elements of the separating device 48, the strand of the band 58, which is under tension and lies downstream of the separating device 48, tears off, while the part joined to the band supply 44 is held against the anvil 50. Since, because of the brake, the roller carrier 42 does not continue to rotate or hardly continues to rotate, it and the band supply 44 stop immediately.

The band supply 44 gradually becomes smaller after a plurality of round bales have been wound. Then there is the situation illustrated in FIGS. 7 and 8, which correspond to the positions in FIGS. 5 and 6, whereby however the band supply 44 has become smaller. The movement range of the adjusting drive 46 is sufficiently large to be able to bring the circumference of the smaller band supply 44 securely against the conveyor element 28. The control 66 moves the adjusting drive 46 forward only far enough that sufficient contact is produced between the band supply 44 and the conveyor element 28 in order to prevent damage to components of the apparatus 40, especially in the case of a large band supply 44.

The control 66 can also detect a force in the holding arm 54 or the electrical current received by an electromotor adjusting device 46, wherein the current suddenly rises when the band supply 44 touches the conveyor element 28, the current is measured and compared with a threshold value. As soon as the threshold value has been exceeded, the adjusting drive 46 is turned off. When there is a hydraulically working adjustment drive 46, the pressure or flow of the fluid used to actuate it can be measured analogously. Preferably the adjusting drive 46 pulls the band supply 44 against the conveyor element 28 with a defined force that can be measured in the manner described and is present as an input to the control 66. The use of a suitable spring between the adjusting drive 46 and the holding arm 54 would also be conceivable in order to produce the defined force.

Figure 7:
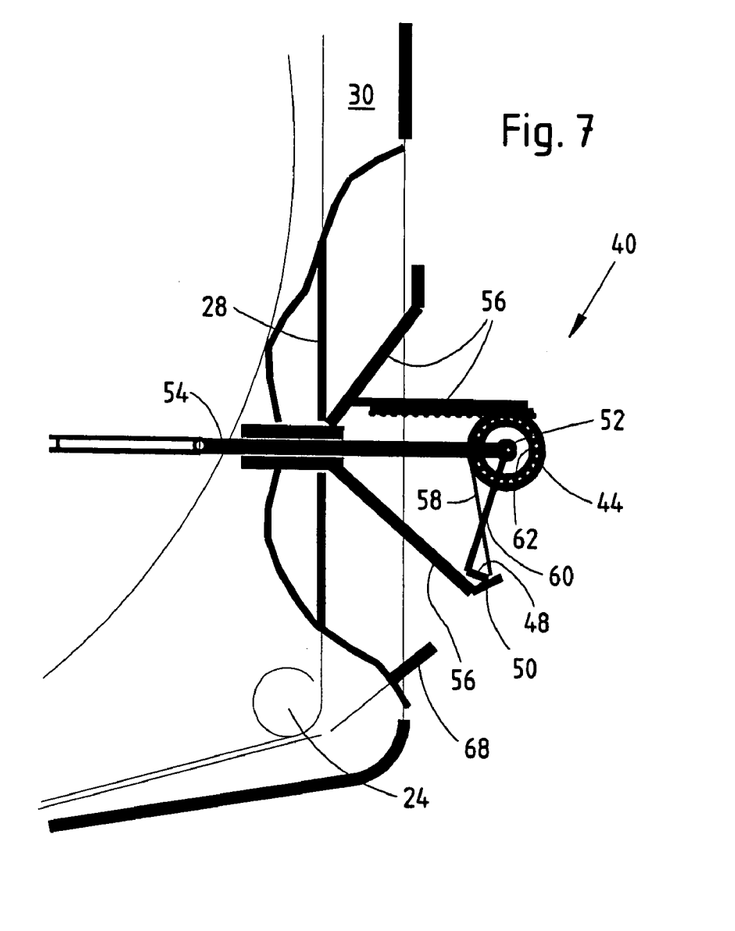
FIG. 7 is a side elevation similar to FIG. 5, but with a reduced band supply.
Figure 8:
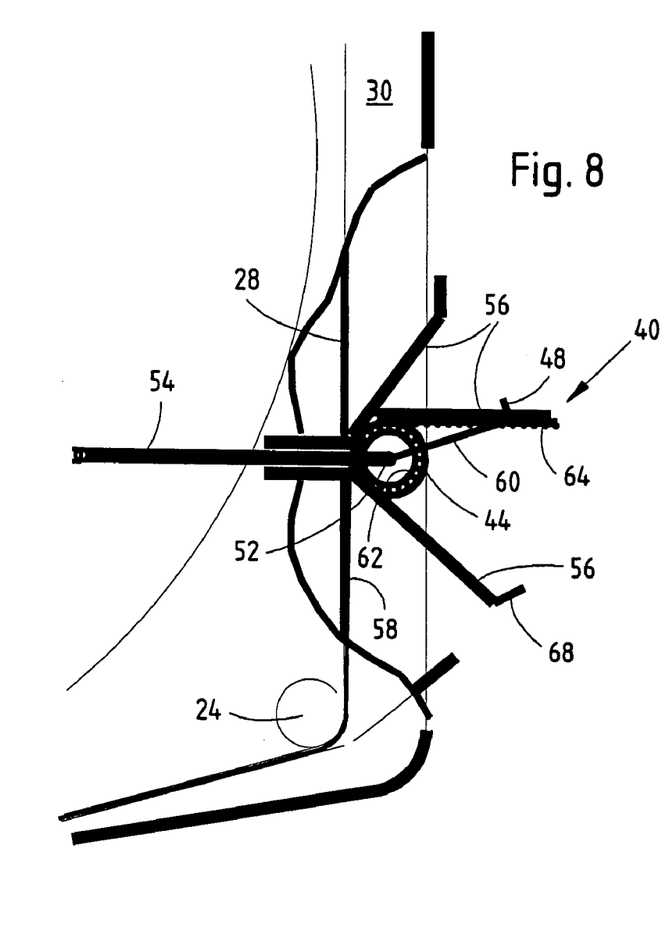
FIG. 8 is a side elevation similar to FIG. 6, but with reduced band supply.

Referring to FIGS. 7 and 8 it can be seen that the pivot range of the separating device 48 is enlarged relative to a larger band supply 44, as was illustrated in FIGS. 5 and 6. The function of the separating device 48 is otherwise the same, however.

Figure 9:
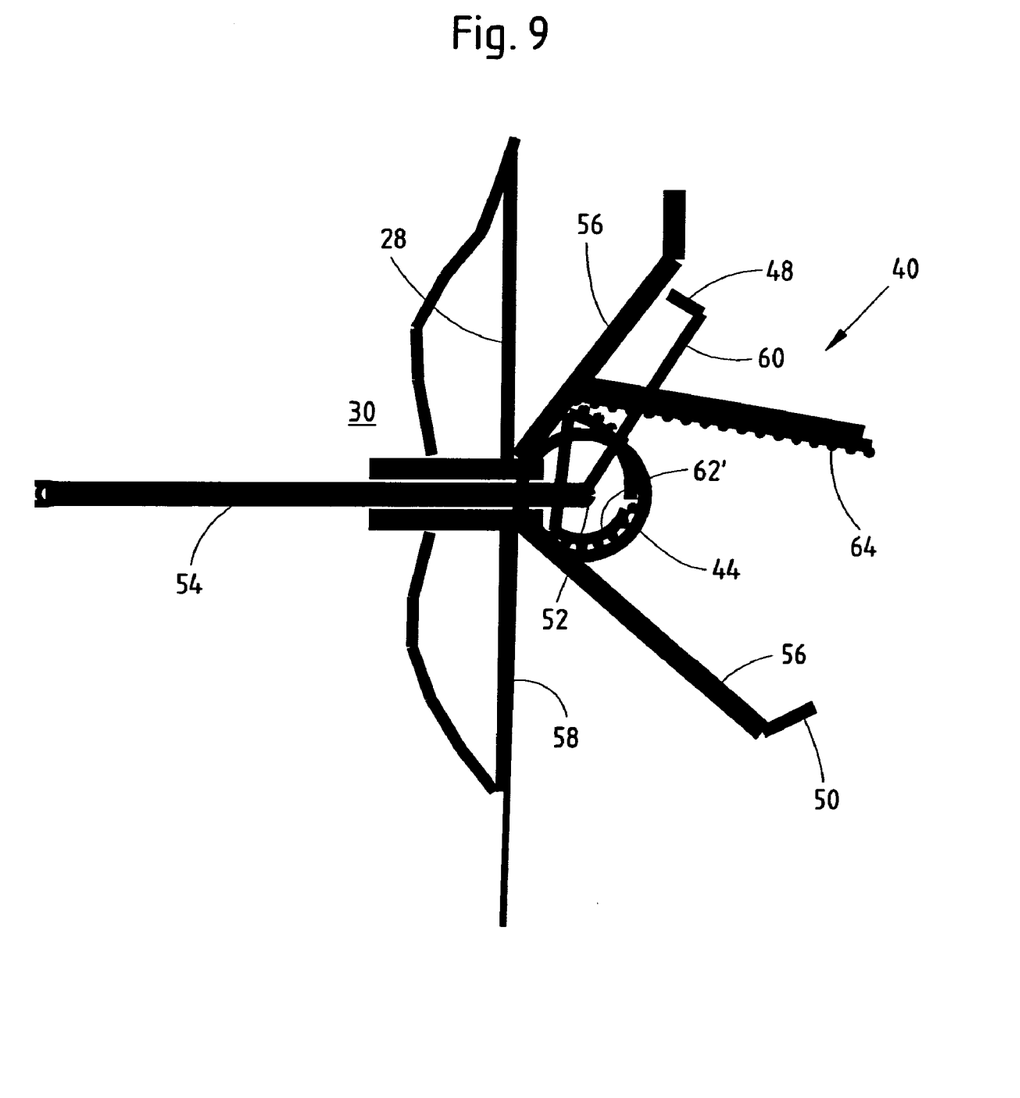
FIG. 9 is a side elevation of an alternative embodiment of the apparatus for securing the loose twine end on the round bale.

FIG. 9 illustrates an alternative embodiment of the apparatus 40. Elements that coincide with the previously described embodiment are labeled with the same reference number. The essential difference from the prior embodiment is in the form of the toothed wheel 62', which here is not circular but rather has an elliptical cross-section. The radius of the area of the toothed wheel 62' cooperating with the gear rack 64 thus increases the farther the adjusting drive 42 has moved the axle 52 forward. Because of this, a lower gear ratio is obtained there, which makes the position of the separating device 48 in the location less dependent on the size of the band supply 44 when the band 58 rolls off than in the previous embodiment.

Figure 10:
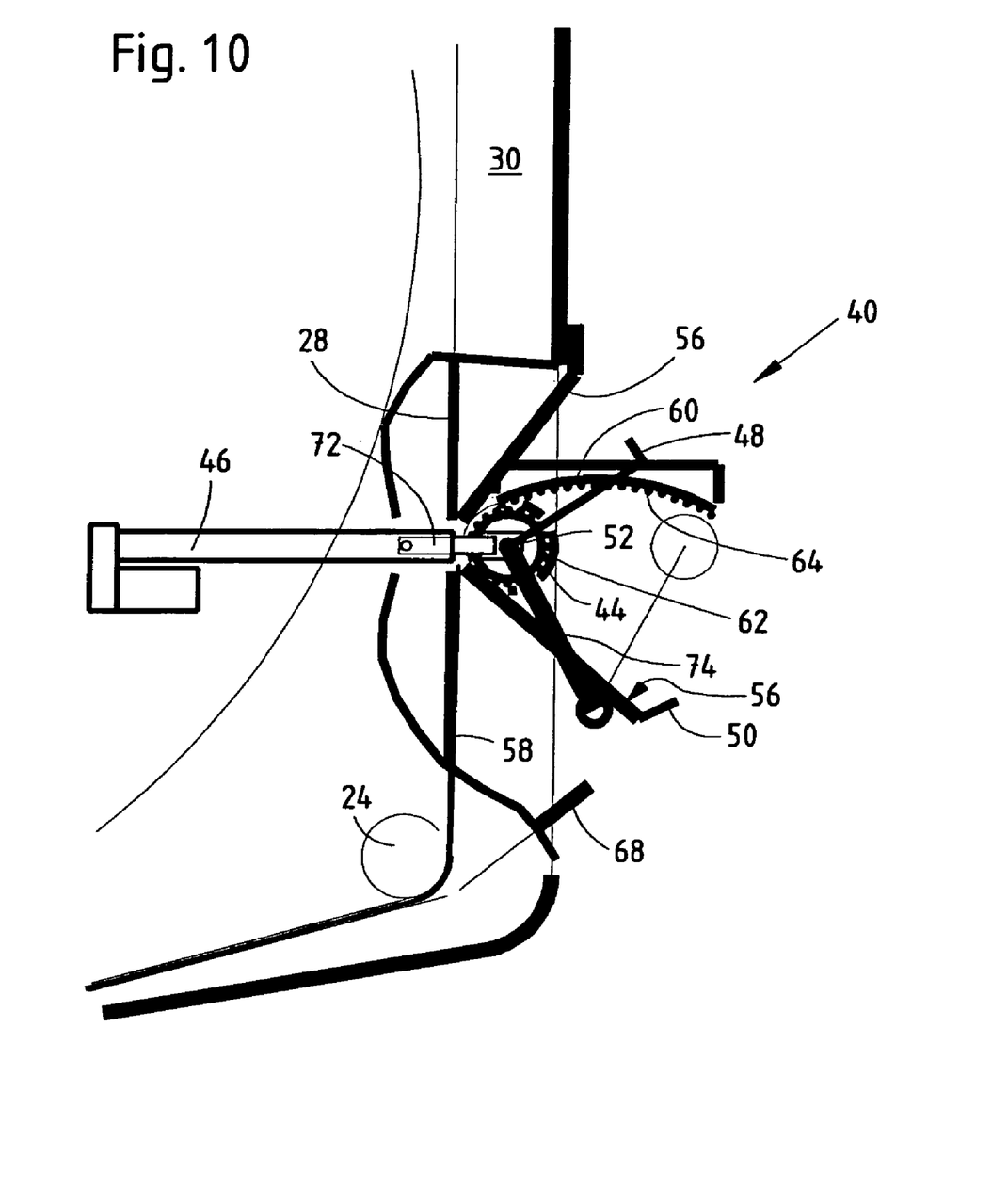
FIG. 10 is a side elevation of yet another alternative embodiment of the apparatus for securing the loose twine end on the round bale.

FIG. 10 illustrates still another embodiment of the apparatus 40. Elements that coincide with the previous embodiments are labeled with the same reference number. The essential difference from the previously discussed embodiments is that the adjusting drive 42 is joined via a first crank 72 to the axle 52, which is coupled via a second crank 74 to the mounting 56. The first crank 72 is rotatably joined at its front end, in the direction of travel, about a horizontal pivot axis that runs transverse to the forward direction on the output of the adjusting drive 42. The first crank 72 is rotatably joined at its rear end, in the direction of travel, about a horizontal pivot axis that runs transverse to the forward direction on the axle 52. The second crank 74 is rotatably joined at its upper end about a horizontal pivot axis that runs transverse to the forward direction on the axle 52. The second crank 74 is rotatably joined at its lower end about a horizontal pivot axis that runs transverse to the forward direction to the mounting 56. This means the axle 52 moves on a circular path, and the gear rack 64 is adapted to this shape.

Alternatively, the adjusting drive 48 could engage with a pin in a longitudinal aperture that extends vertically in the second crank 74. Then the first crank would not be required 72. Also, the adjusting drive 48 could be a rotary drive that rotates the second crank 74 about its lower pivot axis. The first crank 72 would then also not be required. The manner in which the later two embodiments function is the same as the manner in which the embodiment first discussed functions.

In accordance with the provisions of the patent statutes, the present invention has been described in what is considered to represent its preferred embodiment. However, it should be noted that the invention can be practiced otherwise than as specifically illustrated and described.

What is claimed is:

1. In combination with a large round baler including a conveyor element supported so as to define a circumferential portion of a baling chamber and so as to have a section exposed at an exterior location of said baler and following a path leading to an interior of said baling chamber, and a twine tying apparatus arranged for dispensing twine into said baling chamber for being wrapped about a bale formed in said baling chamber and leaving a loose twine end on the bale at a location traversed by said conveyor element, an apparatus for securing said loose twine end on said round bale formed in said baling chamber of said baler, comprising:

a band supply including a band of self-adhering material formed into a roll and mounted for movement between a first position, wherein said band supply is spaced at a distance from said section of said conveyor element, and a second position, wherein said band of said band supply lies against said conveyor element, whereby the band can be unrolled and conveyed to said baling chamber and there wound about a round bale in the area of the loose twine end; and an adjusting drive coupled to said band supply for moving said band supply between said first position, and said second position.

2. The combination, as defined in claim 1, and further including a separating device mounted for movement between an inactive position spaced from said band, and an active position engaging, and effecting separation of said band; and said adjusting drive being coupled to said separating device for moving said separating device for between said inactive and active positions.

3. The combination, as defined in claim 2, wherein the adjusting drive can be operated to simultaneously draw the band supply from the conveyor element and to move the separating device into the active position.

4. The combination, as defined in claim 2, wherein the separating device is mounted for rotational movement between the active and the inactive positions.

5. The combination, as defined in claim 2, wherein the adjusting drive cooperates with the separating device via a drive connection with a rotatable element and a longitudinally extended element that cooperates therewith.

6. The combination, as defined in claim 5, wherein the rotatable element is a toothed wheel and the longitudinally extended element is a gear rack.

7. The combination, as defined in claim 5, wherein the band supply is supported on a moveable axle, the adjusting drive is coupled to said axle for moving the axle along a path, said rotatable element is supported on the axle for rotation about said axle and is in driving connection with the separating device and said longitudinally extended element is mounted stationary and is in engagement with said rotatable element, whereby movement of said rotatable element along said longitudinally extended element causes rotation of said rotatable element.

8. The combination, as defined in claim 2, and further including an anvil located in a path of movement of said separating device; and said adjusting drive being coupled for moving said separating device against said anvil.

9. The combination, as defined in claim 2, wherein in the inactive position, the separating device is positioned upstream of a point of contact between said section of the conveyor element and the band supply when said band supply is in said second position.

10. The combination, as defined claim 1, wherein the adjusting drive is connected to said band supply so as to move the band supply on one of a straight and an arcuate path.

11. The combination, as defined in claim 1, wherein the adjusting drive is one of a linear drive and a rotary drive.

12. The combination, as defined in claim 1, wherein the adjusting drive can be operated to press the band supply against the conveyor element with a defined force.

13. A round bale press including a baling chamber for forming a bale, a tying apparatus for dispensing twine into the baling chamber for wrapping a bale formed therein with a loose twine end located at a pre-selected circumferential zone of said bale, a conveyor element leading to said baling chamber so as to engage said zone of said bale, and said bale press having an apparatus for securing said loose twine end on said round bale, the apparatus including a band supply of self-adhering material formed into a roll and being mounted for movement between a first position, wherein a band of said band supply is spaced from said conveyor element, and a second position, wherein said band is engaged with said conveyor element, an adjusting drive coupled to said band supply and being, operable for selectively moving said band supply between said first and second positions, whereby, when said band is brought into engagement with said conveyor element, the band can be wound about a round bale in the area of the loose twine end.

* * * * *